(12) United States Patent
Moss et al.

(10) Patent No.: US 9,498,909 B2
(45) Date of Patent: Nov. 22, 2016

(54) INJECTION MOLDING FLOW CONTROL APPARATUS AND METHOD

(71) Applicant: Synventive Molding Solutions, Inc., Peabody, MA (US)

(72) Inventors: Mark Moss, Boxford, MA (US); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 397 days.

(21) Appl. No.: 14/311,785

(22) Filed: Jun. 23, 2014

(65) Prior Publication Data

US 2014/0300019 A1  Oct. 9, 2014

Related U.S. Application Data

(63) Continuation-in-part of application No. 13/484,336, filed on May 31, 2012, now Pat. No. 9,011,736, which is a continuation of application No. PCT/US2011/062099, filed on Nov. 23, 2011, application No. 14/311,785, which is a continuation-in-part of application No. 13/484,408, filed on May 31, 2012, now Pat. No. 9,005,509, which is a continuation of application No. PCT/US2011/062096, filed on Nov. 23, 2011.

(60) Provisional application No. 61/838,620, filed on Jun. 24, 2013, provisional application No. 61/843,561, filed on Jul. 8, 2013, provisional application No. 61/896,313, filed on Oct. 28, 2013.

(51) Int. Cl.
*B29C 45/28* (2006.01)
*B29C 45/27* (2006.01)
*B29C 45/17* (2006.01)

(52) U.S. Cl.
CPC ......... *B29C 45/281* (2013.01); *B29C 45/2703* (2013.01); *B29C 2045/1792* (2013.01); *B29C 2045/2712* (2013.01); *B29C 2045/2865* (2013.01); *B29C 2045/2872* (2013.01); *B29C 2945/76076* (2013.01); *B29C 2945/76277* (2013.01); *B29C 2945/76381* (2013.01); *B29C 2945/76598* (2013.01); *B29C 2945/76755* (2013.01); *B29C 2945/76859* (2013.01); *B29C 2945/76933* (2013.01)

(58) Field of Classification Search
CPC .................. B29C 45/281; B29C 2045/2865; B29C 2045/2872
See application file for complete search history.

(56) References Cited

U.S. PATENT DOCUMENTS

| 4,389,002 A | 6/1983 | Devellian et al. |
| 5,492,467 A | 2/1996 | Hume et al. |

(Continued)

FOREIGN PATENT DOCUMENTS

| DE | 19608676 C1 | 1/1990 |
| EP | 0967063 A1 | 12/1999 |

(Continued)

OTHER PUBLICATIONS

Int'l. Preliminary Report on Patentability mailed Aug. 31, 2015 in Int'l. Appln. No. PCT/US2014/043612.

(Continued)

*Primary Examiner* — James Sanders
(74) *Attorney, Agent, or Firm* — Polsinelli PC

(57) ABSTRACT

A method and apparatus for performing an injection molding cycle comprising drivably interconnecting a valve pin to an electric motor actuator and controllably operating the electric motor to drive the valve pin at one or more reduced rates of upstream or downstream travel based on either detection of the position of the pin or actuator or on a preselected length of time at which to drive the valve pin.

9 Claims, 12 Drawing Sheets

(56) References Cited

U.S. PATENT DOCUMENTS

| | | |
|---|---|---|
| 5,545,028 A | 8/1996 | Hume et al. |
| 5,554,395 A | 9/1996 | Hume et al. |
| 5,556,582 A | 9/1996 | Kazmer |
| 5,674,439 A | 10/1997 | Hume et al. |
| 5,871,786 A | 2/1999 | Hume et al. |
| 5,885,628 A | 3/1999 | Swenson et al. |
| 5,894,025 A | 4/1999 | Lee et al. |
| 5,916,605 A | 6/1999 | Swenson et al. |
| 5,948,448 A | 9/1999 | Schmidt |
| 5,948,450 A | 9/1999 | Swenson et al. |
| 5,980,237 A | 11/1999 | Swenson et al. |
| 6,294,122 B1 | 9/2001 | Moss et al. |
| 2012/0248652 A1 | 10/2012 | Galati et al. |

FOREIGN PATENT DOCUMENTS

| | | |
|---|---|---|
| JP | 63166511 | 9/1988 |
| JP | 05-200788 | 10/1993 |
| JP | 06114887 | 6/1994 |
| JP | 07-144347 | 6/1995 |
| WO | 2012074879 A1 | 6/2012 |

OTHER PUBLICATIONS

Response to Written Opinion filed Jul. 29, 2015 in Int'l. Appln. No. PCT/US2014/043612.

Written Opinion mailed Jun. 24, 2015 in Int'l. Appln. No. PCT/US2014/043612.

Response to Written Opinion filed May 7, 2015 in Int'l. Appln. No. PCT/US2014/043612.

Int'l. Search Report and Written Opinion mailed Sep. 22, 2014 in Int'l. Appln. No. PCT/US2014/043612.

Ewikon Product Sheet, Electrical needle drive unit for valve gate systems, Ewikon Heibkanalsysteme GmbH & Co. KG, Frankenberg, DE.

Plastic Engineering & Technical Services, Inc. Product Sheet, Electric Valve Gate System, Plastic Engineering & Technical Services, Inc., Auburn Mills, MI.

INJECTION MOLDING FLOW CONTROL APPARATUS AND METHOD

RELATED APPLICATIONS

This application is a continuation-in-part of and claims the benefit of priority to U.S. application Ser. No. 13/484,336 filed May 31, 2012 which is a continuation of PCT/US2011/062099 filed Nov. 23, 2011, the disclosures of both of the foregoing are incorporated by reference in their entirety as if fully set forth herein.

This application is also a continuation-in-part of and claims the benefit of priority to U.S. application Ser. No. 13/484,408 filed May 31, 2012 which is a continuation of PCT/US2011/062096 filed Nov. 23, 2011, the disclosures of both of the foregoing are incorporated by reference in their entirety as if fully set forth herein.

This application also claims the benefit of priority to U.S. Provisional Application No. 61/838,620 filed Jun. 24, 2013, the disclosure of which is incorporated by reference in its entirety as if fully set forth herein.

This application also claims the benefit of priority to U.S. Provisional Application No. 61/843,561 filed Jul. 8, 2013, the disclosure of which is incorporated by reference in its entirety as if fully set forth herein.

This application also claims the benefit of priority to U.S. Provisional Application No. 61/896,313 filed Oct. 28, 2013, the disclosure of which is incorporated by reference in its entirety as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070), PCT Publication No. WO 2012/074879 (7100WO), and PCT Publication No. WO 2012/-87491 (7100WO1).

BACKGROUND OF THE INVENTION

Injection molding systems have been developed having flow control mechanisms that control the movement of a valve pin over the course of an injection cycle to cause the pin to move either upstream or downstream over the course of injection cycle in order to raise or lower the rate of flow of fluid material to correspond to a predetermined profile of fluid flow rates for the injection cycle. A sensor senses a condition of the fluid material or of the apparatus such as pin position and sends a signal indicative of the sensed condition to a program contained in a controller that uses the signal as a variable input to control movement of the valve pin in accordance with the predetermined profile.

SUMMARY OF THE INVENTION

A method of performing an injection molding cycle in an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the method comprising, drivably interconnecting the valve pin to an electric motor driven by a source of electrical power or energy in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more intermediate rates of upstream and downstream travel extending between zero and a maximum rate of upstream travel and a maximum rate of downstream travel, selecting a length of travel between the third maximum upstream position and a predetermined third position that is downstream of the maximum upstream position and upstream of the first position, controllably operating the electric motor to drive the valve pin at one or more high rates of downstream travel that are equal to or less than the maximum rate of downstream travel when the valve pin is disposed at the third maximum upstream position during the course of an injection cycle, sensing the position of the valve pin to determine when the tip end of the valve pin has reached the preselected third during the course of downstream travel, controllably operating the motor to drive the valve pin at one or more intermediate rates of downstream travel that are less than the one or more high rates of downstream travel when the tip end of the valve pin has been determined in the step of sensing to have reached the third position to drive the tip end of the valve pin continuously downstream from the third position to the first position.

In such a method the one or more high rates of downstream travel are typically equal to the maximum rate of downstream travel.

Such a method can further comprise:

beginning the injection molding cycle from the first position, controllably operating the motor to drive the valve pin at one or more of the intermediate upstream rates of travel over the length of the path of upstream travel between the first position and the second position, sensing the position of the valve pin to determine when the tip end of the valve pin has reached the second position during the course of upstream travel, controllably operating the motor to drive the valve pin continuously upstream from the second position to the maximum upstream position at one or more high upstream rates of travel that are greater than the intermediate upstream rates of travel.

In such a method the motor can be controllably operated to drive the valve pin continuously upstream from the second position to the maximum upstream position at the maximum rate of upstream travel.

In another aspect of the invention there is provided a method of performing an injection molding cycle in an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the method comprising, drivably interconnecting the valve pin to an electric motor driven by a source of electrical power or energy in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more intermediate rates of upstream and downstream travel extending between zero and a maximum rate of upstream travel and a maximum rate of downstream travel, controllably operating the electric motor to drive the valve pin at one or more intermediate rates of downstream travel that are less than the maximum rate of downstream travel beginning when the valve pin is disposed at the third maximum upstream position during the course of an injection cycle to drive the tip end of the valve pin continuously downstream from the third position to the first position at the one or more intermediate rates of downstream travel.

Such a method can further comprise:
beginning the injection molding cycle from the first position,
controllably operating the motor to drive the valve pin at one or more of the intermediate upstream rates of travel over the length of the path of upstream travel between the first position and the second position,
sensing the position of the valve pin to determine when the tip end of the valve pin has reached the second position during the course of upstream travel,
controllably operating the motor to drive the valve pin continuously upstream from the second position to the maximum upstream position at one or more high upstream rates of travel that are greater than the intermediate upstream rates of travel.

In such a method, the motor can be controllably operated to drive the valve pin continuously upstream from the second position to the maximum upstream position at the maximum rate of upstream travel.

In another aspect of the invention there is provided an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the method comprising, an electric motor driven by a source of electrical power or energy, the electric motor being drivably interconnected to the valve pin in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more intermediate rates of upstream and downstream travel extending between zero and a maximum rate of upstream travel and a maximum rate of downstream travel, a controller containing instructions that controllably operates the electric motor to drive the valve pin at one or more high rates of downstream travel that are equal to or less than the maximum rate of downstream travel when the valve pin is disposed at the third maximum upstream position during the course of an injection cycle, a sensor for sensing the position of the valve pin to determine when the tip end of the valve pin has reached a predetermined third position downstream of the maximum upstream position and upstream of the first positions during the course of downstream travel, the controller including instructions that controllably operate the motor to drive the valve pin at one or more intermediate rates of downstream travel that are less than the one or more high rates of downstream travel to drive the tip end of the valve pin continuously downstream from the third position to the first position when the tip end of the valve pin has been determined in the step of sensing to have reached the third position.

The one or more high rates of downstream travel are typically equal to the maximum rate of downstream travel.

The controller can include instructions that controllably operate the motor to drive the valve pin beginning from the first position at one or more of the intermediate upstream rates of travel between the first position and the second position, the sensor sensing the position of the valve pin to determine when the tip end of the valve pin has reached the second position during the course of upstream travel, the controller including instructions to controllably operate the motor to drive the valve pin continuously upstream from the second position to the maximum upstream position at one or more high upstream rates of travel that are greater than the intermediate upstream rates of travel.

The controller can include instructions that controllably operate the motor to drive the valve pin continuously upstream from the second position to the maximum upstream position at the maximum rate of upstream travel.

The controller can include instructions that controllably operate the motor to drive the valve pin continuously upstream beginning from the first position at one or more of the intermediate upstream rates of travel over the entire length of travel of the valve pin from the first position to the maximum upstream position.

In another aspect of the invention there is provided a method of performing an injection molding cycle in an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the method comprising, drivably interconnecting the valve pin to an electric motor driven by a source of electrical power or energy in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more rates of upstream and downstream travel extending between zero and a maximum rate of upstream or downstream travel, selecting a length of travel between the first position and the second position, beginning an injection cycle with the tip end of the valve pin in the first position, controllably operating the electric motor to drive the valve pin at one or more intermediate rates of upstream travel greater than zero and less than the maximum rate of upstream travel to drive the tip end of the valve pin continuously upstream from the first position to the second position, sensing the position of the valve pin to determine when the tip end of the valve pin has reached the second position, controllably operating the motor to drive the valve pin at one or more high rates of upstream travel that are equal to or greater than the intermediate rates of upstream travel to drive the tip end of the valve pin continuously upstream from the second position to the third maximum upstream position at the one or more high rates of upstream travel when the tip end of the valve pin has been determined in the step of sensing to have reached the second position.

The one or more high rates of upstream travel are typically greater than the intermediate rates of upstream travel.

The one or more high rates of upstream travel are typically the maximum rate of upstream travel.

The one or more high rates of upstream travel can be equal to the one or intermediate rates of upstream travel.

Such a method can further comprise:
controllably operating the motor to drive the valve pin at one or more intermediate downstream rates of travel that are less than the maximum rate of downstream travel over a selected length of downstream travel between the maximum upstream position and the first position after the tip end of the valve pin has reached the third maximum upstream position to drive the tip end of the valve pin continuously downstream from the maximum upstream position to the first position.

Such a method can further comprise controllably operating the electric motor to drive the valve pin at the maximum rate of downstream travel over a selected length of downstream travel beginning from the maximum upstream position and subsequently operating the electric motor to drive the valve pin at one or more intermediate rates of downstream travel that are less than the maximum rate of downstream travel to drive the tip end of the valve pin continuously downstream from the maximum upstream position to the first position.

In such a method, the motor can be controllably operated to drive the valve pin at one or more intermediate downstream rates of travel that are less than the maximum rate of downstream travel along the entire path of travel of the valve pin from the maximum upstream position to the first position.

In such a method the motor can be controllably operated to drive the valve pin at the one or more intermediate downstream rates of travel upon sensing the position of the valve pin to determine when the valve pin has reached a preselected downstream position at which the tip end of the valve pin restricts flow of the injection fluid.

An injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, an electric motor driven by a source of electrical power or energy in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more rates of upstream and downstream travel extending between zero and a maximum rate of upstream or downstream travel, a controller including instructions for beginning an injection cycle with the tip end of the valve pin disposed in the first position, the controller including instructions for controllably operating the electric motor to drive the valve pin at one or more intermediate rates of upstream travel greater than zero and less than the maximum rate of upstream travel to drive the tip end of the valve pin continuously upstream from the first position to the second position, a sensor for sensing the position of the valve pin to determine when the tip end of the valve pin has reached the second position, the controller including instructions for controllably operating the motor to drive the valve pin at one or more high rates of upstream travel that are equal to or greater than the intermediate rates of upstream travel to drive the tip end of the valve pin continuously upstream from the second position to the third maximum upstream position at the one or more high rates of upstream travel when the tip end of the valve pin has been determined in the step of sensing to have reached the second position.

In such an apparatus the one or more high rates of upstream travel are typically greater than the intermediate rates of upstream travel.

The one or more high rates of upstream travel are typically the maximum rate of upstream travel.

The one or more high rates of upstream travel can be equal to the one or intermediate rates of upstream travel.

The controller can include instructions for controllably operating the motor to drive the valve pin at one or more intermediate downstream rates of travel that are less than the maximum rate of downstream travel over a selected length of downstream travel between the maximum upstream position and the first position after the tip end of the valve pin has reached the third maximum upstream position and to drive the tip end of the valve pin continuously downstream from the maximum upstream position to the first position.

The controller can include instructions for controllably operating the electric motor to drive the valve pin at the maximum rate of downstream travel over a selected length of downstream travel beginning from the maximum upstream position and subsequently operating the electric motor to drive the valve pin at one or more intermediate rates of downstream travel that are less than the maximum rate of downstream travel to drive the tip end of the valve pin continuously downstream from the maximum upstream position to the first position.

The controller can includes instructions that operate the electric motor to drive the valve pin at the one or more intermediate downstream rates of travel that are less than the maximum rate of downstream travel along the entire path of travel of the valve pin from the maximum upstream position to the first position.

The controller includes instructions that operate the electric motor to drive the valve pin at the one or more intermediate downstream rates of travel upon sensing the position of the valve pin to determine when the valve pin has reached a preselected third position that is downstream of the maximum upstream position and upstream of the first position.

In another aspect of the invention there is provided a method of performing an injection molding cycle in an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the method comprising, drivably interconnecting the valve pin to an electric motor driven by a source of electrical power or energy in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more intermediate rates of upstream and downstream travel extending between zero and a maximum rate of upstream travel and a maximum rate of downstream travel, selecting one or more first lengths of time for the electric motor to operate to drive the valve pin at one or more high rates of downstream travel that are equal to or less than the maximum rate of downstream travel, controllably operating the electric motor to drive the valve pin at the one or more high rates of downstream travel beginning when the valve pin is disposed at the third maximum upstream position during the course of an injection cycle for the one or more selected first lengths of time, controllably operating the motor to drive the valve pin at one or more intermediate rates of downstream travel that are less than the one or more high rates of downstream travel upon expiration of the one or more first selected lengths of time to drive the valve pin continuously downstream to the first position through at least a portion of a path of travel of the valve pin where the tip end of the valve pin restricts flow of the injection fluid through the gate.

In such a method the one or more high rates of downstream travel are typically equal to the maximum rate of downstream travel.

Such a method of can further comprise:
beginning the injection molding cycle from the first position,
controllably operating the motor to drive the valve pin at one or more of the intermediate upstream rates of travel over a preselected second length of time beginning from the first position continuously upstream to the second position,
controllably operating the motor to drive the valve pin continuously upstream from the second position to the maximum upstream position at one or more high upstream rates of travel that are greater than the intermediate upstream rates of travel.

In such a method the motor is typically controllably operated to drive the valve pin continuously upstream from the second position to the maximum upstream position at the maximum rate of upstream travel.

In another aspect of the invention there is provided an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, an electric motor driven by a source of electrical power or energy and drivably interconnected to the valve pin in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more intermediate rates of upstream and downstream travel extending between zero and a maximum rate of upstream travel and a maximum rate of downstream travel, a controller containing instructions that controllably operate the electric motor to drive the valve pin at the one or more high rates of downstream travel beginning when the valve pin is disposed at the third maximum upstream position during the course of an injection cycle for one or more first selected lengths of time, the controller including instructions that controllably operate the motor to drive the valve pin at one or more intermediate rates of downstream travel that are less than the one or more high rates of downstream travel upon expiration of the one or more first selected lengths of time to drive the valve pin continuously downstream to the first position.

In such an apparatus the one or more high rates of downstream travel are equal to the maximum rate of downstream travel.

In such an apparatus,
the controller can include instructions that controllably operate the motor to drive the valve pin at one or more of the intermediate upstream rates of travel over a preselected second length of time beginning from the first position continuously upstream to the second position, and
the controller can include instructions that controllably operate the motor to drive the valve pin continuously upstream from the second position to the maximum upstream position at one or more high upstream rates of travel that are greater than the intermediate upstream rates of travel.

The controller can include instructions that controllably operate the motor to drive the valve pin continuously upstream from the second position to the maximum upstream position at the maximum rate of upstream travel.

In another aspect of the invention there is provided a method of performing an injection molding cycle in an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the method comprising, drivably interconnecting the valve pin to an electric motor driven by a source of electrical power or energy in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more rates of upstream and downstream travel extending between zero and a maximum rate of upstream or downstream travel, beginning an injection cycle with the tip end of the valve pin in the first position, selecting one or more first lengths of time for the electric motor to operate to drive the valve pin at one or more intermediate rates of upstream travel that are less than the maximum rate of upstream travel, controllably operating the electric motor to drive the valve pin at the one or more intermediate rates of upstream travel for the selected one or more first lengths of time to drive the valve pin continuously upstream from the first position to the second position, controllably operating the motor to drive the valve pin at one or more high rates of upstream travel upon expiration of the one or more first selected lengths of time to drive the valve pin continuously upstream to the maximum upstream position.

In such a method the one or more high rates of upstream travel are typically equal to the one or more intermediate rates of upstream travel.

In such a method the one or more high rates of upstream travel are typically greater than the one or more intermediate rates of upstream travel.

In such a method the one or more high rates of upstream travel can be the maximum rate of upstream travel.

Such a method can further comprise:
selecting one or more second lengths of time for the electric motor to operate to drive the valve pin at one or more high rates of downstream travel that are equal to or less than the maximum rate of downstream travel,
controllably operating the electric motor to drive the valve pin for the one or second selected lengths of time downstream at the one or more high rates of downstream travel after the valve pin has reached the maximum upstream position,
controllably operating the electric motor to drive the valve pin at one or more intermediate rates of downstream travel that are less than the maximum rate of downstream travel on expiration of the one or more second selected lengths of time.

In such a method the one or more high rates of downstream travel are typically equal to the maximum rate of downstream travel.

The one or more intermediate rates of downstream travel can be less than the one or more high rates of downstream travel.

The motor can be controllably operated to drive the valve pin at one or more intermediate downstream rates of travel that are less than the maximum rate of downstream travel along the entire path of travel of the valve pin from the maximum upstream position to the first position.

In another aspect of the invention there is provided an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the method comprising, an electric motor interconnected to the valve pin, the electric motor driven by a source of electrical power or energy in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more rates of upstream and downstream travel extending between zero and a maximum rate of upstream or downstream travel, a controller that includes instructions that controllably operate the electric motor to drive the valve pin at one or more intermediate rates of upstream travel that are less than the maximum rate of upstream travel for one or more first selected lengths of time to drive the valve pin continuously upstream beginning from the first position through at least a portion of the length of the path of travel between the first position and the second position, the controller including instructions that controllably operate the motor to drive the valve pin at one or more high rates of upstream travel upon expiration of the one or more first selected lengths of time to drive the valve pin continuously upstream to the maximum upstream position.

In such an apparatus the one or more high rates of upstream travel are typically equal to the one or more intermediate rates of upstream travel.

The one or more high rates of upstream travel are typically greater than the one or more intermediate rates of upstream travel.

The one or more high rates of upstream travel can be the maximum rate of upstream travel.

In such an apparatus, the controller can include instructions that controllably operate the electric motor to drive the valve pin for one or second selected lengths of time downstream at the one or more high rates of downstream travel after the valve pin has reached the maximum upstream position, and the controller can include instructions that controllably operate the electric motor to drive the valve pin at one or more intermediate rates of downstream travel that are less than the maximum rate of downstream travel on expiration of the one or more second selected lengths of time.

In such an apparatus the one or more high rates of downstream travel are typically equal to the maximum rate of downstream travel.

The one or more intermediate rates of downstream travel are typically less than the one or more high rates of downstream travel.

The controller can include instructions that controllably operate the motor to drive the valve pin at one or more intermediate downstream rates of travel that are less than the maximum rate of downstream travel along the entire path of travel of the valve pin from the maximum upstream position to the first position.

BRIEF DESCRIPTION OF THE DRAWINGS

The above and further advantages of the invention may be better understood by referring to the following description in conjunction with the accompanying drawings in which.

DETAILED DESCRIPTION

Figure 7A:
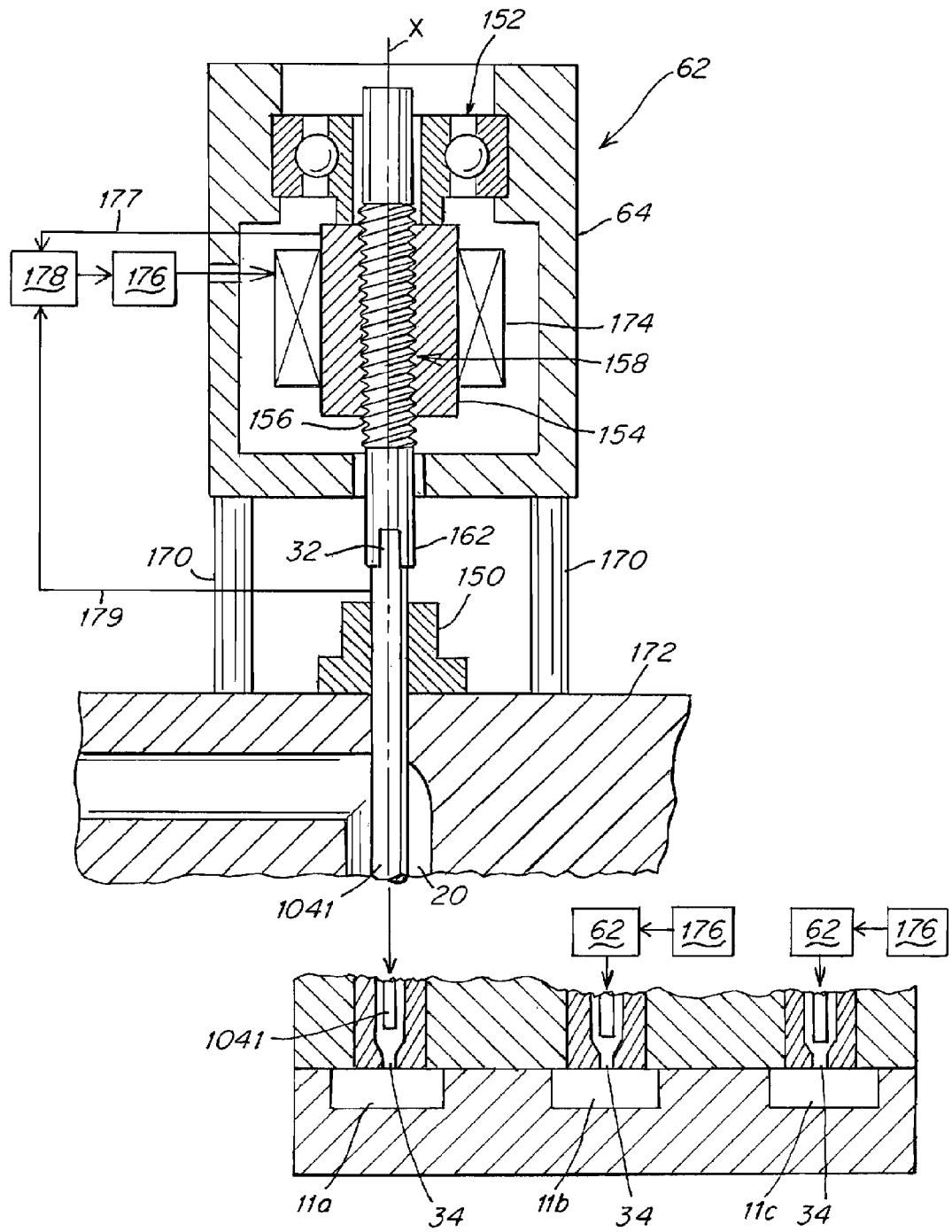
FIG. 7A is a schematic cross-section of an embodiment of the invention showing multiple electrically powered or electric actuators 62 that simultaneously inject into separate cavities during a single injection cycle, each electric actuator being comprised of a motor 154, 174 that is interconnected to an axial shaft 158 that is in turn interconnected to a valve pin 1041 that enters 34 into separate cavities, the motors 62 each being controllably driven by an electronically programmable controller 176.
Figure 7B:
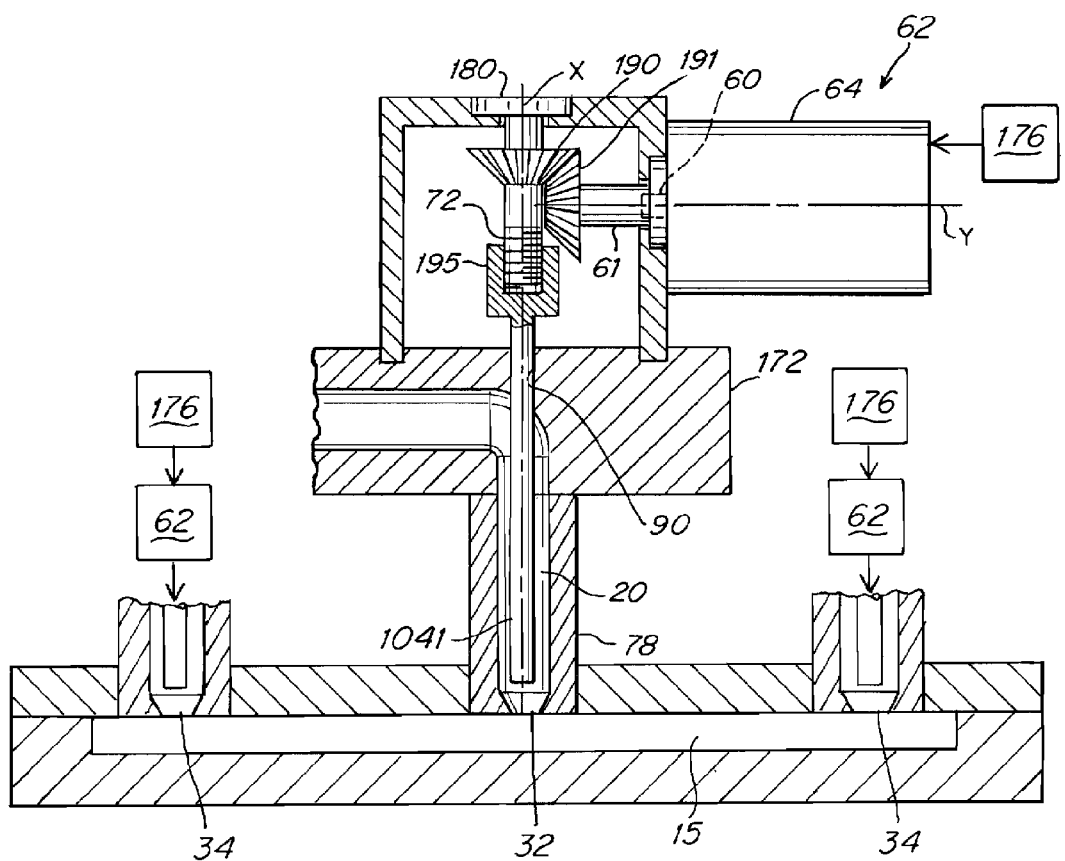
FIG. 7B is a schematic of another embodiment of the invention showing multiple electric actuators 62 each driving a valve pin 1041 that inject at different valve pin entry locations into the same mold cavity 15 in a cascade process.

Electric or electronic motors or actuators, the moving component of which is driven by electrical power are used in the present invention as the drive and actuator mechanism for driving a valve pin 1040, 1041, 1042 continuously upstream or downstream through a fluid delivery channel leading to a mold cavity at reduced velocities relative to a maximum velocity according to certain downstream and upstream drive protocols that both minimize the injection cycle time and the occurrence of defects, vestiges or artifacts that be left in the molded parts that are formed within the cavities of the mold(s). Typical examples of suitable electric actuators are shown in FIGS. 7A, 7B. Unlike hydraulically or pneumatically driven actuators, electric actuators have peculiar space, programming, control, operation and installation requirements that are not readily implemented in a conventional injection molding system having a heated manifold, top clamp plate and hot and cold mold halves.

Figure 1:
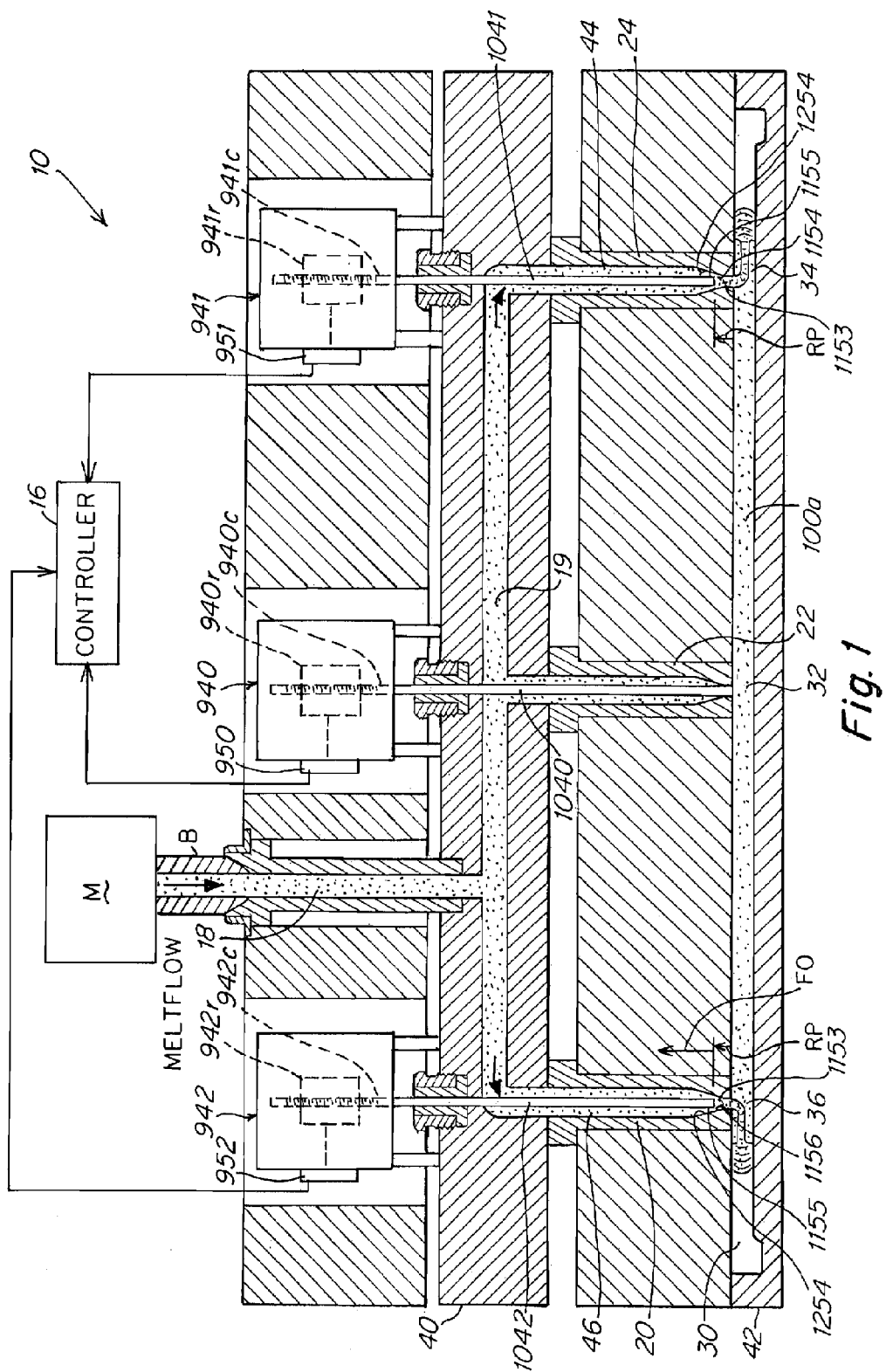
FIG. 1 is a schematic of one embodiment of the invention showing a pair of sequential gates showing a first gate entering the center of a cavity having been opened and shown closed such that a first shot of fluid material has entered the cavity and traveled past the position of a second sequential gate, the second gate shown being open with its valve pin having traveled along an upstream restricted flow path RP allowing a second sequential shot of fluid material to flow into and merge with the first shot of material within the cavity.

FIG. 1 shows a system 10 with a central nozzle 22 feeding molten material from an injection molding machine through a main inlet 18 from a barrel B of an injection molding machine M to a distribution channel 19 of a manifold 40. The distribution channel 19 commonly feeds three separate nozzles 20, 22, 24 which all commonly feed into a common cavity 30 of a mold 42. One of the nozzles 22 is controlled by an electric motor actuator 940 and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

As shown in the FIGS. 1, 1A embodiment, the injection cycle is a cascade process where injection is effected in a sequence from the center nozzle 22 first and at a later predetermined time from the lateral nozzles 20, 24. The cascade process is discussed in detail as an example only, the invention encompassing configurations and protocols where a single valve pin and valve gate inject into a single cavity.

Embodiments where the valve pin is withdrawn upstream at reduced upstream velocity starting from a fully downstream gate closed position are discussed in detail herein. Reduced velocity means a velocity that is less than the maximum velocity at which the electric actuator is capable of driving the pin, typically less than about 75% of maximum and more typically less than about 50% of maximum velocity whether upstream or downstream.

Figures 3A, 3B:
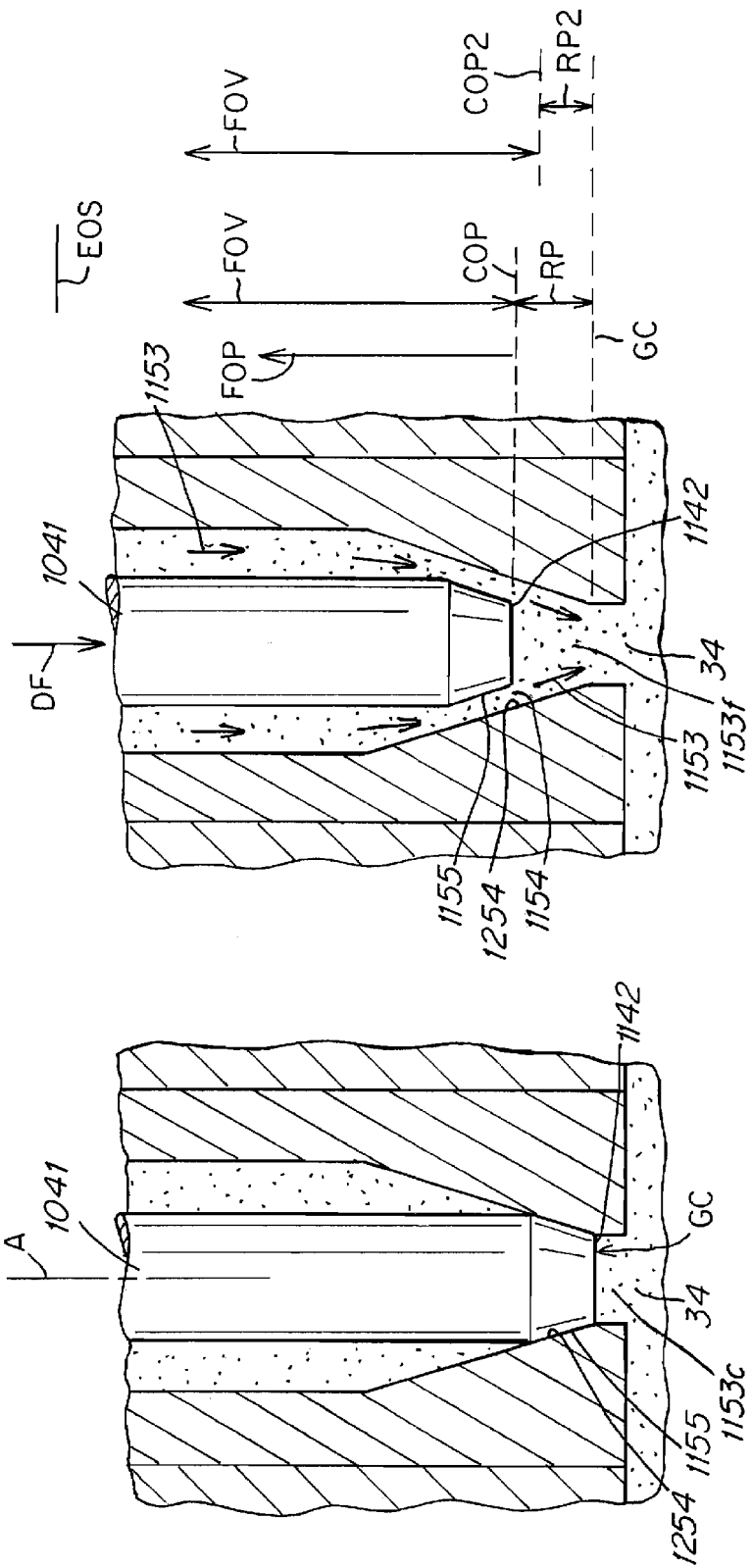
FIGS. 3A-3B show tapered end valve pin positions at various times and positions between a starting closed position as in FIG. 3A and various upstream opened positions, RP representing a selectable path length over which the velocity of withdrawal of the pin upstream from the gate closed position to an open position is reduced relative to the velocity of upstream movement that the valve pin would normally have over the uncontrolled velocity path FOV when the pin velocity is at its maximum.
Figure 4B:
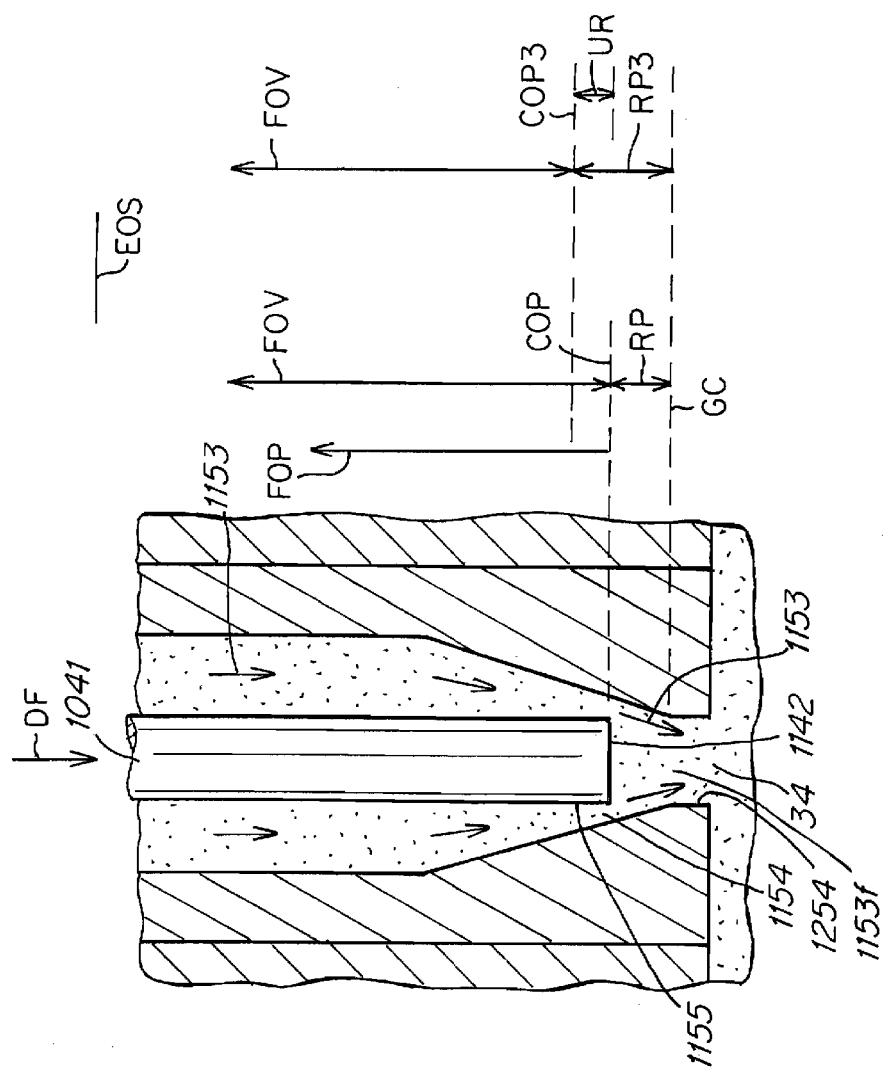
FIGS. 4A-4B show a system having a valve pin that has a cylindrically configured tip end, the tips ends of the pins being positioned at various times and positions between a starting closed position as in FIG. 4A and various upstream opened positions, RP wherein RP represents a path of selectable length over which the velocity of withdrawal of the pin upstream from the gate closed position to an open position is reduced relative to the velocity of upstream movement that the valve pin would normally have when the electric actuator is operating at maximum speed.
Figure 4A:
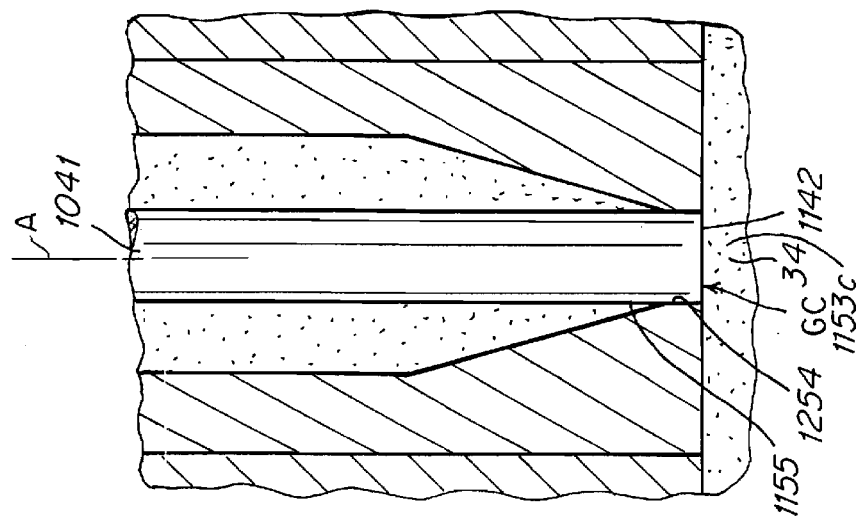

The invention includes configurations where a valve pin is driven downstream starting from a fully upstream, gate open position at one or more reduced downstream velocities over at least the latter portion of the downstream path of travel of the pin toward the gate where the tip end 1142 of the pin 1041 restricts flow of the injection fluid through the gate RP, RP2, RP3 such as shown in FIGS. 3A and 4A. Reduced downstream velocity drive of a valve pin 1041, FIGS. 3A, 3B, 4A, 4B can serve to lessen the degree of downward force DF, FIGS. 3B, 4B, exerted by the tip end 1142 of the pin on the injection fluid 1153f, FIGS. 3B, 4B, that is forcibly pushed through the gate and into the cavity 1153c, FIGS. 3A, 4A, when the tip end of the valve pin travels downstream to a position where the tip end closes the gate, FIGS. 3A, 4A. Such reduced force DF exerted on the injection fluid 1153g at the very end portion of travel RP, RP2 of the injection cycle at the entrance 34 to the cavity of the mold thus reduces the likelihood of a blemish or artifact being formed on the part that is formed within the cavity at the gate area 34.

In one embodiment of a method according the invention, an electric actuator 940, 941, 942 is drivably interconnected to a valve pin 1040, 1041, 1042 in an arrangement wherein the electric motor drives the valve pin along the axis A, FIGS. 3A, 4A, of the valve pin and drives the tip end 1142 of the valve pin between a first position where the tip end of the valve pin obstructs the gate 34 to prevent the injection fluid from flowing into the cavity, a second position upstream of the first position RP, RP2, RP3 wherein the tip end 1142 of the valve pin restricts flow 1153 of the injection fluid along at least a portion of the length of the drive path extending between the first position and the second position, and a third maximum upstream position FOP where the injection fluid material flows freely without restriction from the tip end 1142 of the pin through the first gate.

The electric motor 62 can be configured and arranged relative to the valve pin 1041 such that the driven rotor 154, 174 and shaft 158, 162 components of the motor 62, FIG. 7A are axially aligned with the axis A of the valve pin. Alternatively, a motor 62 configuration can be used such as in FIG. 7B where the driven rotor and shaft 61 components are arranged at an angle to the axis A, FIGS. 3A, 4A or axis X, FIG. 7B of the valve pin 1041 component.

The electric motor is electrically operable to drive the valve pin at one or more intermediate rates of upstream and downstream travel extending between zero and a maximum rate of upstream travel and a maximum rate of downstream travel, the method comprising selecting a length of travel between the third maximum upstream position and a predetermined third position that is downstream of the maximum upstream position and upstream of the first position, and controllably operating the electric motor to drive the valve pin at one or more high rates of downstream travel that are equal to or less than the maximum rate of downstream travel when the valve pin is disposed at the third maximum upstream position during the course of an injection cycle, sensing the position of the valve pin to determine when the tip end of the valve pin has reached the preselected third during the course of downstream travel, and controllably operating the motor to drive the valve pin at one or more intermediate rates of downstream travel that are less than the one or more high rates of downstream travel when the tip end of the valve pin has been determined in the step of sensing to have reached the third position to drive the tip end of the valve pin continuously downstream from the third position to the first position.

Figure 1A:
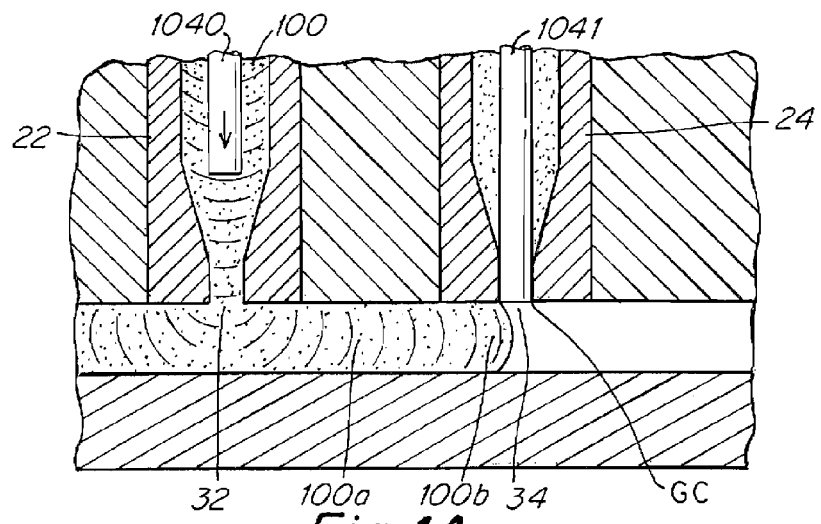
FIGS. 1A-1E are schematic cross-sectional close-up views of the center and one of the lateral gates of the FIG. 1 apparatus showing various stages of the progress of injection.
Figure 1B:
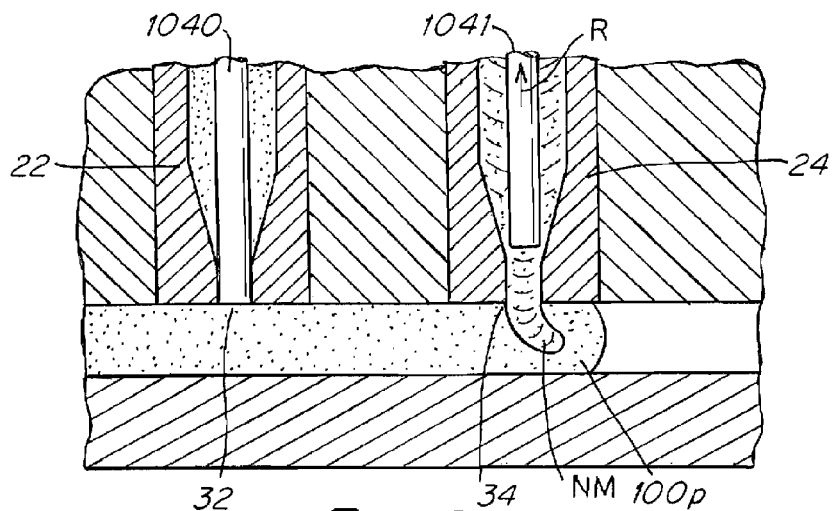
Figure 1C:
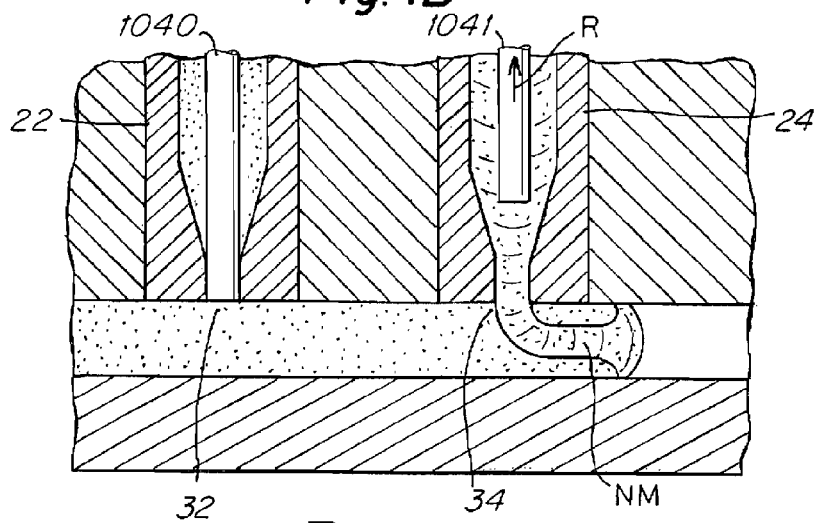

In an embodiment shown in FIG. 1A the injection cycle is started by first opening the pin 1040 of the center nozzle 22 and allowing the fluid material 100 (typically polymer or plastic material) to flow up to a position the cavity just before 100b the distally disposed entrance into the cavity 34, 36 of the gates of the lateral nozzles 24, 20 as shown in FIG. 1A. After an injection cycle is begun, the gate of the center injection nozzle 22 and pin 1040 is typically left open only for so long as to allow the fluid material 100b to travel to a position just past 100p the positions 34, 36. Once the fluid material has traveled just past 100p the lateral gate positions 34, 36, the center gate 32 of the center nozzle 22 is typically closed by pin 1040 as shown in FIGS. 1B, 1C, 1D and 1E. The lateral gates 34, 36 are then opened by upstream withdrawal of lateral nozzle pins 1041, 1042 as shown in FIGS. 1B-1E. As described below, the rate of upstream withdrawal or travel velocity of lateral pins 1041, 1042 is controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material NM is allowed to first enter the mold cavity into the stream 102p that has been injected from center nozzle 22 past gates 34, 36, the two streams NM and 102p mix with each other. If the velocity of the fluid material NM is too high, such as often occurs when the flow velocity of injection fluid material through gates 34, 36 is at maximum, a visible line or defect in the mixing of the two streams 102p and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102p, the appearance of a visible line or defect in the final molded product can be reduced or eliminated.

Figure 2:
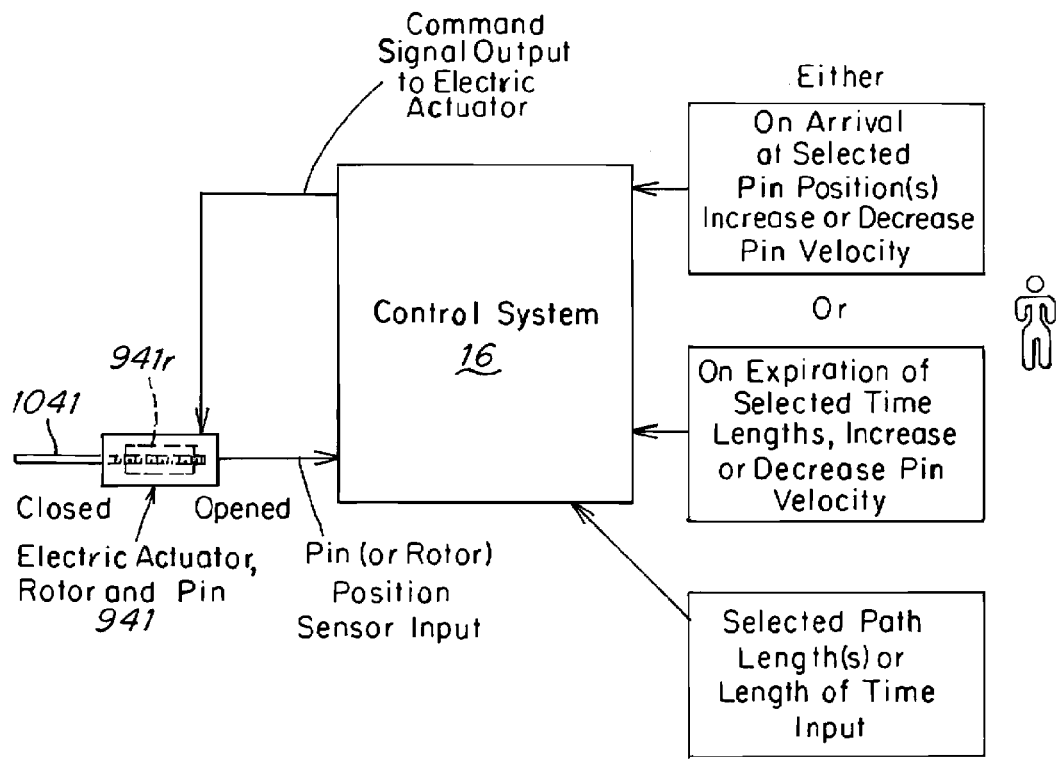
FIG. 2 is a schematic of one embodiment of the invention showing generically an electric actuator connected to a valve pin and a valve pin, the controller having the ability to instruct the electric actuator to drive the valve pin at reduced velocities based on detection of preselected pin positions or based on preselected lengths of time.
Figure 2A:
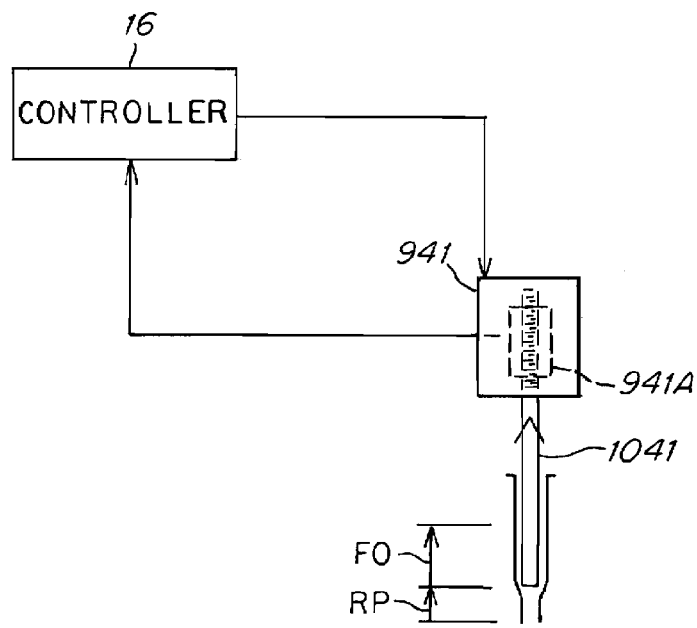
FIG. 2A is a simplified schematic of FIG. 2 showing schematically a reduced velocity path of pin travel (RP) and a high velocity path of pin travel (FOV).

The rate or velocity of upstream withdrawal of pins 1041, 1042 starting from the closed position is controlled via controller 16, FIGS. 1, 2, 2A which controls the rate and direction of upstream and downstream travel of the electric motor actuators 940, 941, 942. A "controller," as used herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, instructions, controllers and the like that perform functions such as monitoring, alerting and initiating an injection molding cycle including a control device that is used as a standalone device for performing conventional functions such as signaling and instructing an individual actuator or a series of interdependent actuators to start an injection cycle, namely move an actuator and associated valve pin from a gate closed to a gate open position.

As shown in FIGS. 1, 2, 2A, the electric actuators 940, 941, 942 each have a rotating rotor 940r, 941r, 942r that is driven by electrical power one or more of the precise polarity, amplitude, voltage and strength of which is controlled for input to the motors by controller 16. The rotating rotors 940r, 941r, 942r are interconnected to a translationally movable shaft or other suitable connecting devices 940c, 941c, 942c that interconnect the valve pins 1040, 1041, 1042 to the driven rotors 940r, 941r, 942r. A typical interconnection between a shaft driven by a rotor and the head of a valve pin is shown in U.S. Reexamination Certificate U.S. Pat. No. 6,294,122 C1 the disclosure of which is incorporated herein by reference in its entirety as if fully set forth herein.

FIG. 7A shows one embodiment of the invention using an electric actuator 62 interconnected to the end 162 of an axial drive screw 158 which is in turn directly connected to the end 32 of a valve pin 1041. In such an embodiment, the screw 158 and associated nut 154 act as an actuating mechanism. As shown, a portion of the length of the screw 158 is threaded with screw threads 156 which are screwably engaged within nut component 154. As schematically shown, nut component 154 is mounted against axial movement (along axis X) on or to bearing 152 which is in turn mounted against axial movement on or to motor housing 64 which is in turn mounted against axial movement to manifold 172. As schematically shown, nut 154 is mounted on or to the inner rotatable race of bearing 152 and is drivably rotated by electrical power input to coils 174 around axis X. As nut 154 is controllably rotated, screw 158 is controllably driven and travels along axis X and pin 1041 is simultaneously driven and travels axially together with screw 158. As shown, pin 50 is slidably mounted in a complementary aperture in manifold 172 and a bushing 150 which seals against leakage of molten plastic. The pin 1041 extends within melt channel 20 and is movable along its axis X without rotation. By virtue of the direct coaxial connection between screw 158 and pin 1041, and the rigid mounting of nut 154 against axial movement to housing 64 and the rigid mounting against axial movement of housing 64 to manifold 172 via mounts 170, axial force to which the pin 1041 is subject is transmitted axially to the rotor of the motor 64. To provide for absorption of such axial forces and to relieve the rotor of such load, the nut 154 is mounted in, on or to bearing 152 which is rigidly mounted to the housing of motor 64. Bearing 152 thus absorbs axial forces to which the screw 158 is subject. As shown, a controller 176 which can, in one embodiment receive signals representative of the output of a position sensor 178 is provided having a program for executing an algorithm which controls the input of electrical power to servomotor coils 174. Controller 176 is the same as or equivalent to controller 16 as shown in and discussed with reference to other Figures.

The electric actuator 62 is powered and driven by electrical energy or power input to the coils 174 that rotatably drive magnet 154 that in turn drive axial screw or rotor 156. The electronic controller 176 is capable of precisely driving the electric coils 174 according to any pre-programmed electronic program, circuit or microcontroller according to any of the drive protocols discussed herein.

Where a position sensor 178 is used, such a sensor typically senses 177 the rotational or axial position of some component of the motor 62 such as screw 156, magnet 154 or alternatively senses 179 the axial position of the valve pin 1041 itself. As used herein including the claims, sensing the position of a valve pin 1040, 1041, 1042 or the tip end of a valve pin is the same as or equivalent to sensing the rotational or axial position of the rotor components 154, 174 or of the shaft or screw components 158, 162 of the electric actuator and vice versa. Thus any reference to sensing the position of a valve pin or the tip end of the valve pin is the same as sensing the position of the actuator and vice versa.

The signal 177, 179 that indicates position is sensed by the sensor and is input to the controller 176 which can use such a real-time signal indicative of actuator or pin position in a program to trigger the initiation and velocity or rate of travel of upstream withdrawal or downstream closure of the valve pin 1041 or actuator 62 at selected times or over selected lengths over the course of an injection cycle.

In alternative embodiments, the controller 176 can include a program that controls the movement of the actuator 62 and pin 1041 via an algorithm that relies on the input of preselected lengths of time during an injection cycle selected by the user over which preselected lengths of time the pin 1041 and actuator 62 are driven at varying preselected velocities or rates of upstream and downstream travel.

Alternatively, the controller 176 can utilize a program that utilizes both a position 177, 179 signal received from a sensor 178 and, or a preselected length of time selected by the user as the basis for instructing the electric actuator to travel at one or more reduced velocities over selected portions of the stroke length of the valve pin and actuator.

In the FIG. 7A embodiment, multiple separate electric actuators 62 are operated and controlled by controller 176, each separate actuator 62 controlling a valve pin 1041 that controls injection simultaneously during a single injection cycle into multiple separate cavities 11a, 11b, 11c of a mold 13

FIG. 7B shows another embodiment of the invention where multiple electrically powered actuators 62 operate separate valves and pins 1041 that control injection through separate gates 34 that each inject into a single cavity 15 of a mold 13 during a single injection cycle in a cascade injection process.

As shown in FIG. 7B, the shaft 60 of an electrically driven motor 62 is drivably interconnected to a slidably mounted pin 1041 through a bevel gear engagement between the head 190 of a screw 72 and the head 191 of an extension member 61 of the motor shaft 60. As can be readily imagined, the screw component could alternatively have threads along its length (in place of the beveled head 190) which mesh with a worm at the end of extension 61 (in place of the beveled member 191). As shown, the axis Y of the shaft 60 is perpendicular to the axis X of the pin 1041 and the actuating screw mechanism 72 such that axial forces which may occur along axis X are not transmitted along axis Y to the shaft 60.

In the FIG. 7B. embodiment, the pin 1041 has a nut 195 integrally forming the end of the pin 1041 which is drivably interconnected to, i.e. screwably engaged with, the actuating screw 72. The pin 1041 is slidably mounted in a complementary aperture 90 within manifold 75 for movement along its axis X within melt flow channel 20. The actuating screw 72 is mounted via disc 180 to housing 58 which is, in turn, fixedly mounted to manifold 75 such that screw 72 is drivably rotatable around axis X and axially stationary along axis X. Screw 72 is drivably rotatable around axis X via the screwable engagement between bevel gears 190, 191. Shaft extension member 61 is coaxially connected to the motor shaft 60 (via rigid connection between connecting disc 210 and a complementary connecting member attached to shaft 60 which is not shown) such that as the shaft 60 is rotatably driven around axis Y the extension member 61 and its associated bevel gear 191 are simultaneously rotatably driven around axis Y. As can be readily imagined, as screw 72 is rotatably driven around axis X via the meshed bevel gears 190, 191, pin 50 is translationally driven along axis X via the screwable engagement between nut end 195 and screw 72. Thus the screw 72 acts as an actuating member to and through which axial forces are transmitted to and from pin 1041.

The FIG. 7B motors 62 can be electronically controlled by a controller 176, optionally using position sensors 178 and signals 177, 179, in the same manner as described regarding the FIG. 7A motors 62.

As described above, the electric actuator controlled pins 1041 of the present invention are typically controlled such that the pin 1041 starts in a gate closed position at the beginning of an injection cycle, and is then next withdrawn upstream at a velocity or rate of travel that is less than the maximum velocity that the electric actuator 62 is capable of withdrawing the pin 1041 so that the rate of flow of injection fluid through a gate 34 is less than the maximum rate of flow of injection fluid material thus minimizing the likelihood that a defect will appear in the part that is formed within the cavity 11a, 11b, 11c or 15 at the points of injection into the cavities.

After the pins 1041 have been withdrawn upstream to an upstream position where the flow of injection fluid material is no longer restricted (and thus at maximum flow rate), the pins 1041 can be withdrawn at maximum rate of upstream travel or velocity in order to shorten the injection cycle time. Alternatively, when the pins 1041 have been withdrawn to a position upstream where maximum injection flow rate is occurring, the pins 1041 can continue to be withdrawn at a reduced rate of travel or velocity to ensure that injection fluid does not flow through the gates 34 at a rate that causes a defect in the molded part.

Similarly, on downstream closure of the pins 1041 after they have reached their maximum upstream withdrawal positions, the rate of travel of the pins is preferably controlled by controller 176 such that the pins 1041 travel downstream to a fully gate closed position at a reduced rate of travel or velocity that is less than the maximum rate of downstream travel or velocity over some portion or all of the stroke length between fully upstream and closed.

At the beginning of an injection cycle in a cascade configuration such as shown in FIGS. 1, 7B, the gate of a lateral valve 34, 36 is typically closed. When an injection cycle is started, the controller instructs the actuator 941 to move the valve pin 1041 of the lateral gate upstream out of and from the gate closed position FIGS. 3A, 4A to one or more selected upstream positions as described below with reference to FIGS. 3B, 4B at a preselected reduced upstream velocity, namely upstream velocity(ies) that is(are) less than the maximum upstream velocity at which the electric actuator 941 is capable of driving the valve pin 1041. The controller 16 includes circuitry or instructions that can controllably vary the rate of travel, upstream or downstream of the piston of pin(s) 1041. The direction and rate of travel of the other two valve pins 1040, 1042 are similarly controllable via controlled electrical power feed to motors 940, 942 via the connections shown in FIG. 1.

The user programs controller 16 or 176 via data inputs on a user interface to instruct the electric actuators to drive pins 1041, 1042 at an upstream (or downstream) velocity of travel that is reduced relative to a maximum velocity that the electric motors system can drive the pins 1041, 1042 to travel either upstream or downstream.

In one embodiment where a position sensor 950, 951, 952 is used the reduced rate of pin withdrawal (or downstream) rate or velocity is executed until a position sensor such as 951, 952 detects that an actuator 941, 952 or an associated valve pin (or another component), has reached a certain position such as the end point COP, COP2, FIGS. 3B, 4B of a restricted flow path RP, RP2. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

Figure 1D:
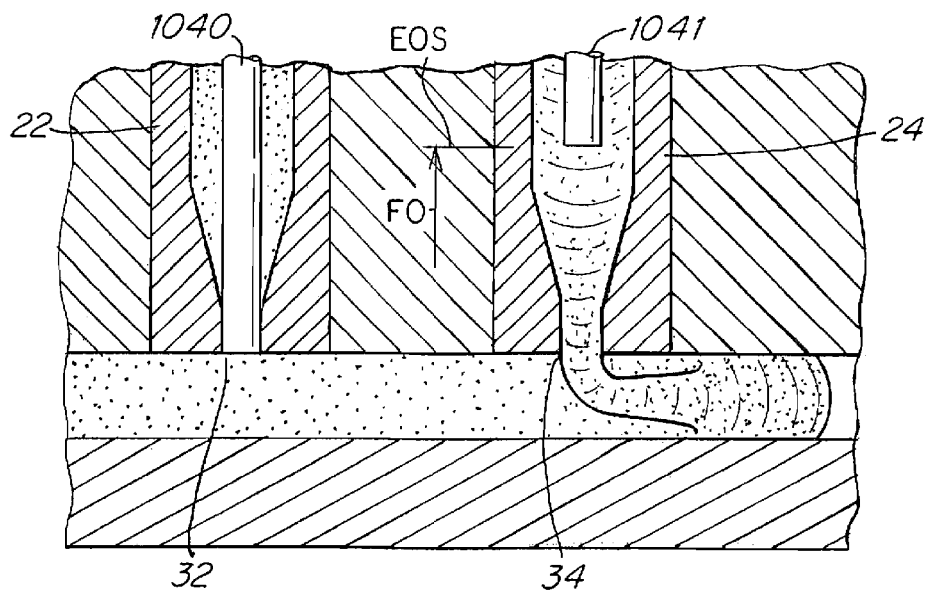
Figure 1E:
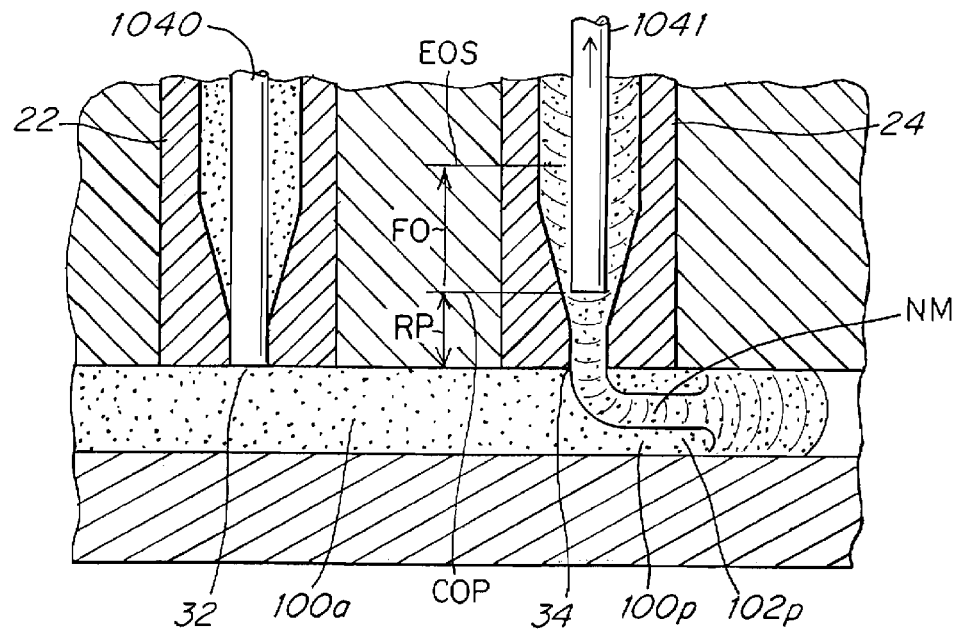

FIG. 1 shows position sensors 950, 951, 952 for sensing the position of the actuator cylinders 941, 942 and their associated valve pins (such as 1041, 1042) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36. When the pins 1041, 1042 are withdrawn upstream to a position where the tip end of the pins 1041 are in a fully upstream open position such as shown in FIG. 1D, the rate of flow of fluid material through the gates 34, 36 is at a maximum. However when the pins 1041, 1042 are initially withdrawn beginning from the closed gate position, FIG. 1A, to intermediate upstream positions, FIGS. 1B, 1C, a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 1, 1B, 1C, 1E and 3B, 4B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 3B, 4B, the pins 1041 can be withdrawn at a higher or maximum velocity at the end COP2 of a less than completely restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically is about 2-6 mm and even more typically 2-4 mm in length. As shown in FIG. 2 in such an embodiment, a control system or controller 16 is preprogrammed to control the sequence and the rates of valve pin 1040, 1041, 1042 opening and closing. The controller 16 controls the rate of travel, namely velocity of upstream travel, of a valve pin 1041, 1042 from its gate closed position for at least the predetermined path length of travel or the predetermined amount of time that is selected to withdraw (or drive downstream) the pin at a selected reduced velocity rate.

The velocity of withdrawal of the valve pins 1041, 1042 is determined by regulation of one or more of the power, voltage, amperage of electrical energy output to the electric motors. Adjustment of the electrical energy input to less than 100% open thus reduces the rate of rotation of the rotor of the electric motor which in turn reduces the velocity of upstream (or downstream) travel of the pins 1041, 1042 for either the selected length of pin travel or the selected period of time. Where a position sensor 950, 951, 952 is used exclusively to control the motors 940, 941, 942, at the end of the travel or length of path RP, RP2, the position sensor signals the controller 16 (or 176), the controller determines that the end COP, COP2 has been reached and the motor is operated at a rotational velocity, typically to its 100% open position to allow the valve pins 1041, 1042 to be driven at maximum upstream velocity FOV in order to reduce the cycle time of the injection cycle.

Controller 16 or 176 includes an interface that enables the user to input any selected degree of electrical energy or power needed to operate the motors 940, 941, 942 at less than full speed for beginning of a cycle from the gate closed position of the valve pins 1041, 1042 or for any portion or all of the downstream portion of an injection cycle as described with reference to FIGS. 6A-6D. Thus the user selects a reduced upstream or downstream velocity of the pins 1041, 1042 over any selected portions of the pin path length from fully closed to fully open such as in FIGS. 5A-5D (and vice versa such as in FIGS. 6A-6D) or over any selected portions of the time of travel from fully closed to fully open such as in FIGS. 5A-5D (or vice versa such as in FIGS. 6A-6D) by inputting to the controller 16 or 176 the necessary data to control the motors.

The user inputs such selections into the controller 16 or 176. Where a position sensor and a protocol for selection of the velocities over selected path lengths is used, the user also selects the length of the path of travel RP, RP2 of the valve pin or the position of the valve pin or other component over the course of travel of which the valve 600 is to be maintained partially open and inputs such selections into the controller 16 or 176. The controller 16 or 176 includes conventional programming or circuitry that receives and executes the user inputs. The controller may include programming or circuitry that enables the user to input as a variable a selected pin velocity rather than a degree of electrical energy input to the motors, the programming of the controller 16 automatically converting the inputs by the user to appropriate instructions for reduced energy input to the motors at appropriate times and pin positions as needed to carry out a pin profile such as in FIGS. 5a-5D and 6A-6D.

Typically the user selects one or more reduced pin velocities that are less than about 90% of the maximum velocity at which the motors 940, 941, 942 can drive the pins, more typically less than about 75% of the maximum velocity and even more typically less than about 50% of the maximum velocity at which the pins 1041, 1042 are drivable by the electric motors. The actual maximum velocity at which the actuators 941, 942 and their associated pins 1041, 1042 are driven is predetermined by selection of the size and configuration of the actuators 941, 942. The maximum drive rate of the motors 940, 941, 942 is predetermined by the manufacturer and the user of the motors and is typically selected according to the application, size and nature of the mold and the injection molded part to be fabricated.

As shown by the series of examples of programs illustrated in FIGS. 5A-5D one or more reduced pin velocities can be selected and the pin driven by reduced velocity drive by an electric actuator between the gate closed (X and Y axis zero, injection cycle start position) and the final intermediate upstream open gate position RP, RP2 (4 mm for example in the FIG. 5A example, 5 mm in the FIG. 5B example) at which point the controller 16 or 176 in response to position sensing or expiration of preselected lengths of time instructs the motors to drive pin 1041, 1042 to travel upstream at a higher, typically maximum, upstream travel velocity (as shown, 100 mm/sec in the FIGS. 5A-5D examples). In the FIG. 5A example, the reduced pin velocity is selected as 50 mm/sec. In practice the actual velocity of the pin may or may not be precisely known, the Y velocity axis corresponding (and generally being proportional) to the degree of electrical energy input to the motor that drives a pin, 100 mm/sec corresponding to the maximum motor rotational drive velocity; and 50 mm/sec corresponding to 50% of maximum rotational drive of the motor 940, 941, 942. In the FIG. 5A example, the path length RP over which the valve pin 1041, 1042 travels at the reduced 50 mm/sec velocity is 4 mm. After the pin 1041, 1042 has been driven to the upstream position COP position of about 4 mm from the gate closed GC position, the controller 16 instructs the motor 941 to operate at full 100% speed at which time the pin is driven at the maximum travel rate 100 mm/sec for the predetermined length of pin travel remaining or the remaining amount of time that it takes for the pin to travel to the fully upstream position.

Figure 5A:
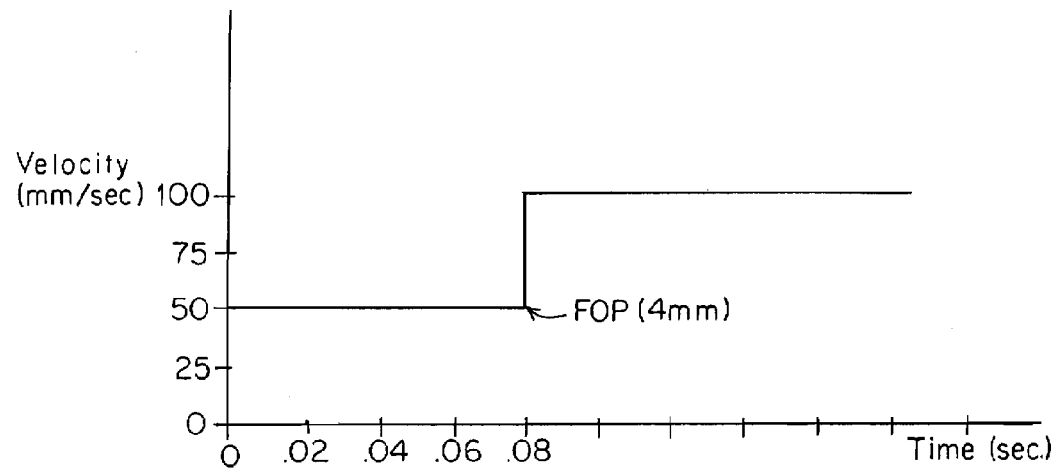
FIGS. 5A-5D are a series of plots of pin velocity versus position each plot representing a different example of the opening of a gate lateral to a central gate via continuous upstream withdrawal of a valve pin at one rate or set of rates over an initial flow path RP and at another higher rate or set of rates of upstream withdrawal of the valve pin beginning at a pin position of FOP and beyond when the fluid material flow is typically at a maximum unrestricted rate of flow through the open gate without any restriction or obstruction from the tip end of the pin.
Figure 5B:
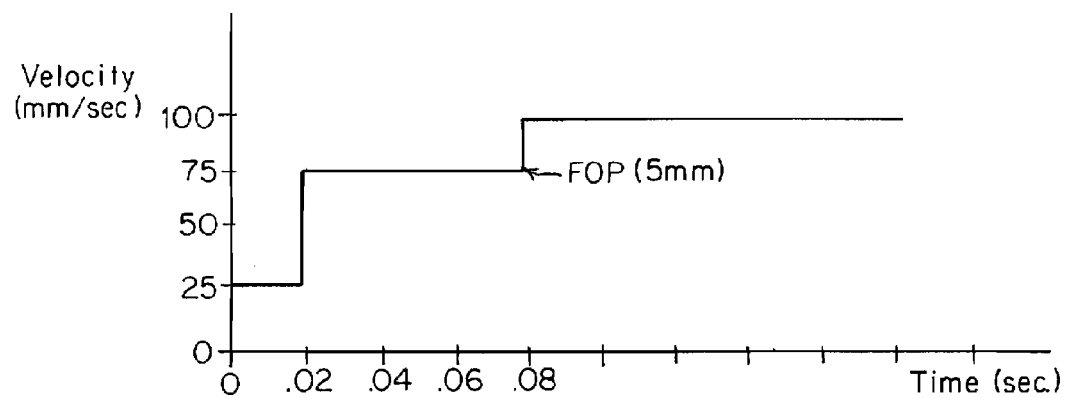
Figure 5C:
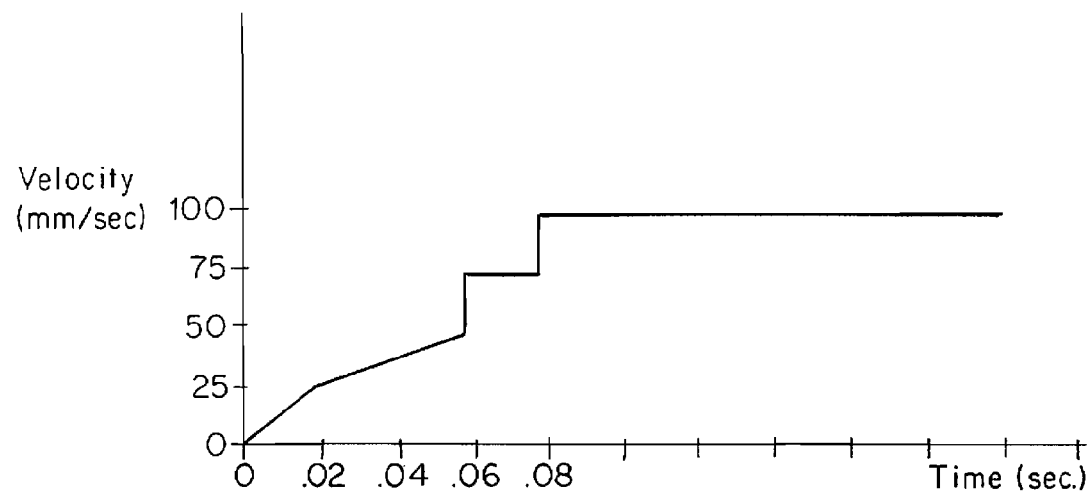
Figure 5D:
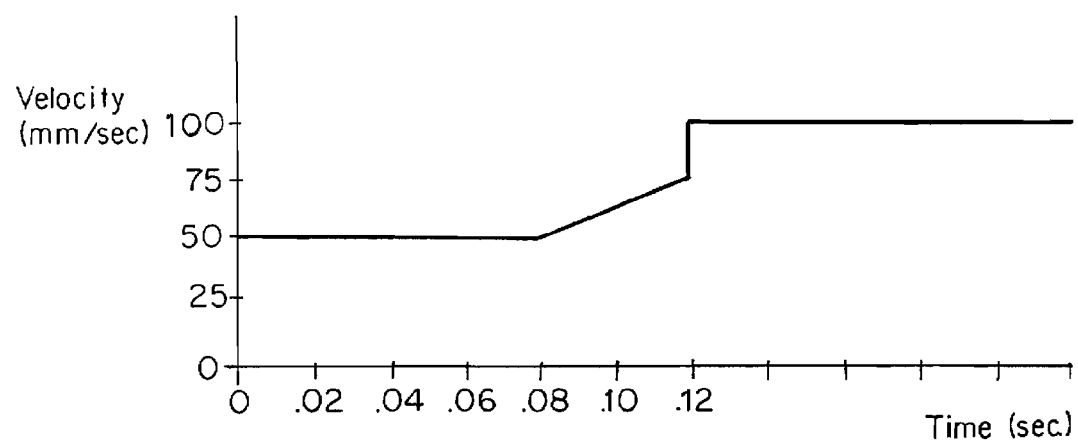

FIGS. 5B-5D illustrate a variety of alternative examples for driving the pin 1041, 1042 at reduced velocities for various durations of time. For example as shown in FIG. 5B, the pin is driven for 0.02 seconds at 25 mm/sec, then for 0.06 seconds at 75 mm/sec and then allowed to go to full valve open velocity shown as 100 mm/sec.

As shown in FIGS. 5A-5D, the velocity of the valve pin when the pin reaches the end of the reduced velocity period, the motor 941 can be instructed to drive at maximum speed instantaneously or alternatively can be instructed to take a more gradual approach up, between 0.08 and 0.12 seconds, to the maximum motor speed as shown in FIG. 5D. In all cases the controller 16 or 176 instructs the valve pin 1041, 1042 to travel continuously upstream rather than follow a profile where the pin might travel in a downstream direction during the course of the injection cycle. Most preferably, the electric actuators and valve pin are adapted to move the valve pin between a gate closed position and a maximum upstream travel position that defines an end of stroke position for the actuator and the valve pin and/or subsequently between the maximum upstream position back downstream to the gate closed position. Most preferably the valve pin is moved at the maximum velocity at one or more times or positions over the course of upstream travel of the valve pin past the upstream gate open position.

Figure 6A:
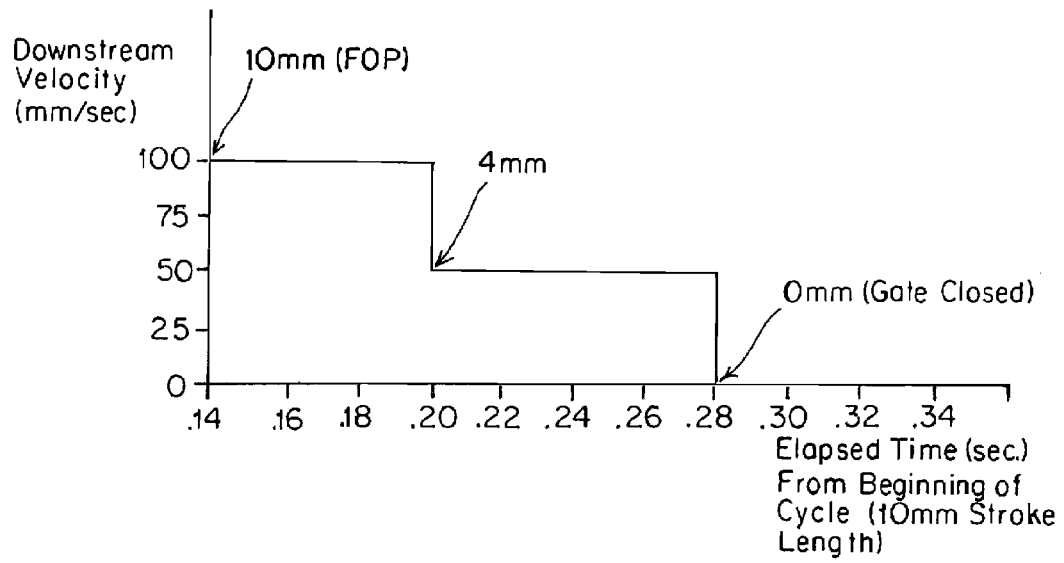
FIGS. 6A-6D show various examples of downstream velocity protocols for driving a valve pin from a maximum upstream position to a gate closed position.
Figure 6B:
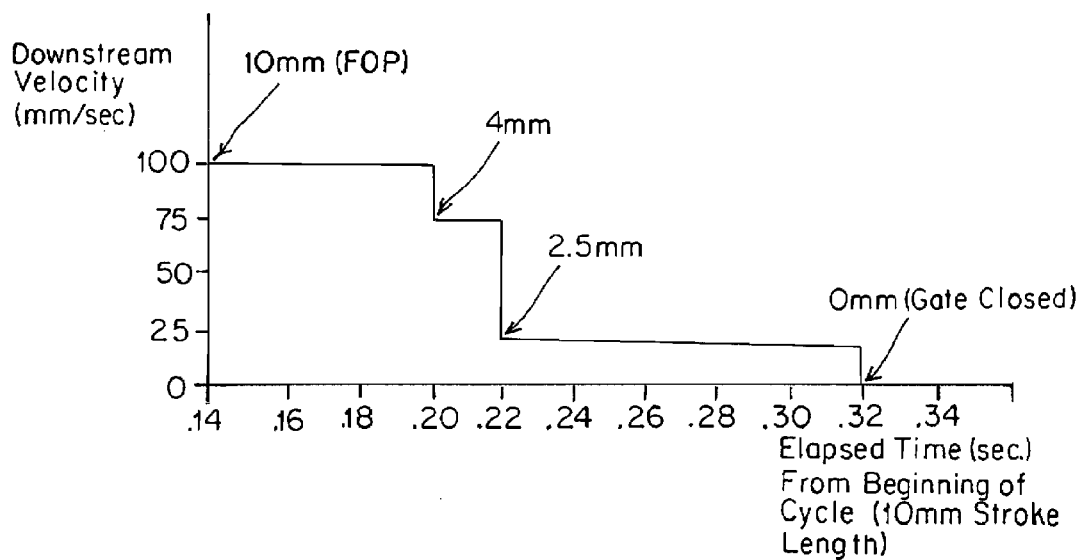
Figure 6C:
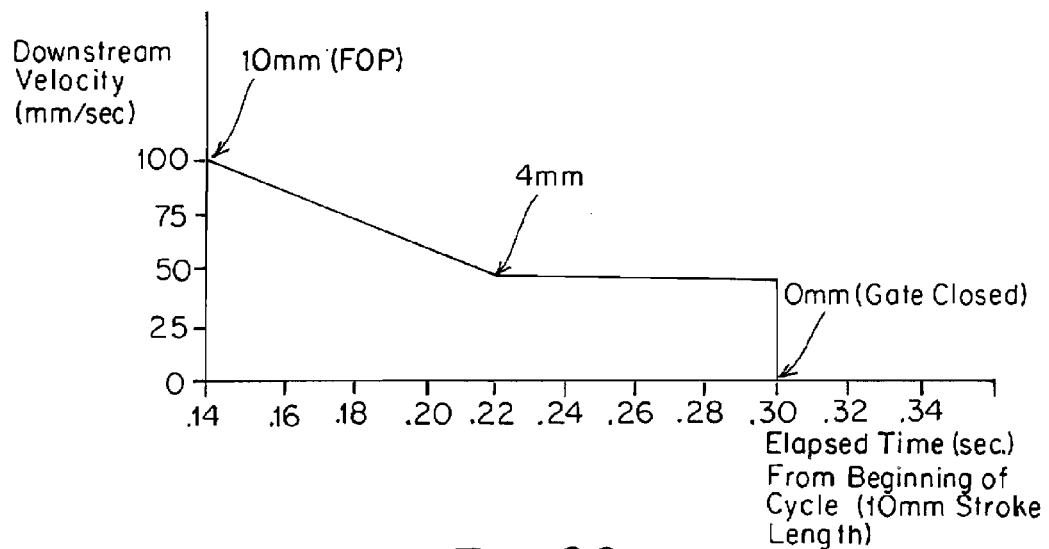

FIGS. 6A-6D show an embodiment where the stroke length is 10 mm between gate closed and maximum upstream positions. As illustrated in FIGS. 6A-6D the pin has already been driven over the course of 0.14 seconds to the maximum 10 mm upstream position. In accordance with the invention, when the pin has reached the maximum upstream 10 mm position, the pin 1041 can driven by the motor 941 at one or more reduced (less than maximum) pin velocities over the course of all or a portion of the pin's downstream travel from maximum upstream 10 mm to gate closed or 0 mm. In the FIG. 6A example, the pin and motor are driven at maximum speed (10 mm/sec) for 0.06 seconds until the tip end of the pin 1142 (FIGS. 3A-4B) is driven to the upstream open gate position RP, RP2 that resides at 4 mm upstream of gate closed or 0 mm position at which point the controller 16 or 176 in response to position sensing of the pin at 4 mm or upon expiration of a preselected lengths of time (0.06) instructs the motors to drive pin 1041, 1042 to travel downstream continuously at a reduced velocity of 50 mm until the tip end of the pin reaches the gate closed or 0 mm position. FIG. 6B shows a similar protocol to the FIG. 6A protocol where the pin 1041 is driven initially for about 0.06 seconds at maximum speed to the 4 mm position and subsequently at reduced 75 mm/sec speed for 0.02 seconds to the 2.5 mm from gate closed position and subsequently driven at 25 mm/sec for 0.1 seconds to the gate closed 0 mm position. FIG. 6C shows another downstream drive protocol according to the invention where the pin 1041, starting from the maximum upstream 10 mm position, is driven continuously downstream at a reduced velocity that decreases linearly from 100 mm/sec to 50 mm/sec for 0.08 seconds and is then driven for an additional 0.08 seconds at a single reduced velocity of 50 mm/sec to the gate closed 0 mm position.

Figure 6D:
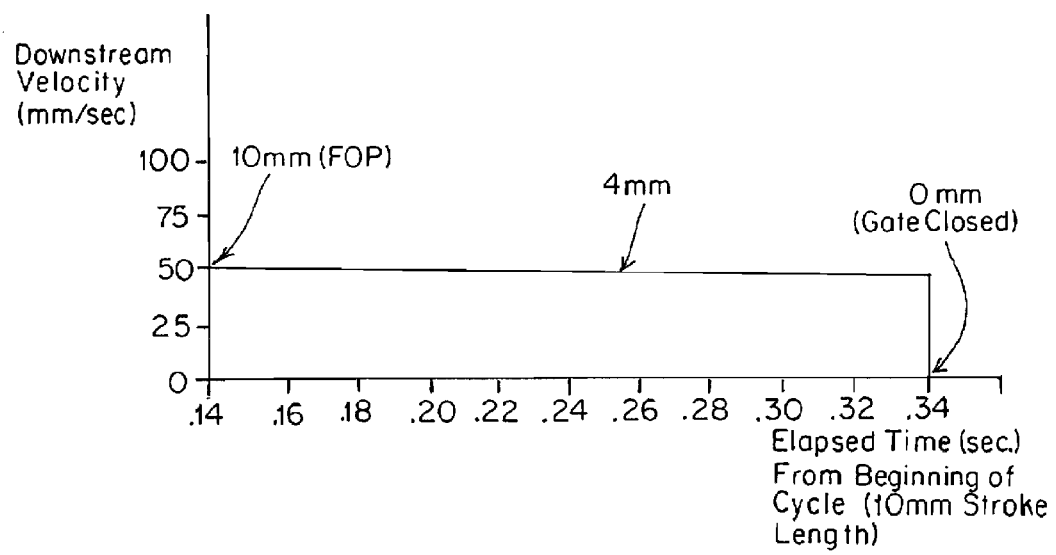

FIG. 6D shows another downstream drive protocol according to the invention where the pin 1041, starting from the maximum upstream 10 mm position, is driven continuously for 0.02 seconds at a single reduced downstream velocity of 50 mm until the tip end 1142 of the pin 1041 reaches the gate closed (0 mm) position.

Preferably, the valve pin and the gate are configured or adapted to cooperate with each other to restrict and vary the rate of flow of fluid material 1153, FIGS. 3A-3B, 4A-4B over the course of travel of the tip end of the valve pin through the restricted velocity path RP. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has traveled to or beyond the length of the restricted flow path RP (which is, for example the 4 mm upstream travel position of FIGS. 5A-5C).

In one embodiment, as the tip end 1142 of the pin 1041 continues to travel upstream from the gate closed GC position (as shown for example in FIGS. 3A, 4A) through the length of the RP path (namely the path traveled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), FIGS. 5A-5D, where the pin is no longer restricting flow of injection mold material through the gate. In such an embodiment, at the expiration of the predetermined amount of time when the pin tip 1142 reaches the FOP (full open) position FIGS. 5A, 5B, the pin 1041 is immediately driven by the electric actuator at maximum velocity FOV.

In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV. In the alternative examples shown in the FIGS. 3B, 4B examples, when the pin has traveled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In another example shown in FIGS. 3B 4B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In the FIGS. 5A, 5B examples, the upstream FOP position is about 4 mm and 5 mm respectively upstream from the gate closed position. Other alternative upstream FOP positions are shown in FIGS. 5C, 5D.

In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 4B example the velocity or drive rate of the pin 1041 is not changed over until the tip end of the pin 1041 or actuator 941 has reached the changeover position COP3. As in other embodiments, a position sensor can sense either that the valve pin 1041 or an associated component has traveled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 or 176 being programmed to instruct the electric actuator to be driven at one or more reduced rotational velocities for the time or path length of an entire closed GC to fully open EOS cycle.

In the FIGS. 5A-5D and 6A-6D examples, maximum or FOV velocity is 100 mm/sec. Typically, when the time period for driving the pin 1041 at reduced velocity has expired and the pin tip 1142 has reached the position COP, COP2, the electric actuator is operated at maximum velocity such that the pins 1041, 1042 are driven at the maximum velocity or rate of travel that the electric motor is capable of driving the pins 1041 et al. At the expiration of the predetermined reduced velocity drive time or upon sensing of the pins having reached the COP or COP2 position, the pins 1041, 1042 are typically driven further upstream past the COP, COP2 position to the maximum end-of-stroke EOS position at a velocity greater than the initial reduced velocity and typically at maximum velocity. The upstream COP, COP2 position is downstream of the maximum upstream end-of-stroke EOS open position of the tip end 1142 of the pin.

The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC. The controller 16 includes a processor, memory, user interface and circuitry and/or instructions that receive and execute the user inputs of percentage of maximum valve open or percentage of maximum voltage or current input to the motor drive for opening and closing the restriction valve, time duration for driving the valve pin at the selected valve openings and reduced velocities.

A suitable position sensor can track and signal the rotational position of the rotor or the axial position of the valve pin or a drive shaft of the motor. As can be readily imagined position sensor mechanisms can be used that employ optical sensors, sensors that mechanically or electronically detect the movement of the valve pin or movement of the rotor or a translationally moving shaft or other component of the motor.

In alternative embodiments the controller 16 or 176 can include a processor and instructions that receive the pin position information and signals from the position sensor and calculate the real time velocity of the pin from the pin position data in real time at one or more times or positions over the course of the pin travel through the RP, RP2, RP3 path length and/or beyond. Typically such calculations of velocity are continuous throughout the cycle. In such an embodiment, the calculated pin velocity is constantly compared to a predetermined target profile of pin velocities and the velocity of the pin is adjusted in real time by the controller 16, 176 to conform to the profile. In this embodiment as in all previously described embodiments, the pin is moved continuously upstream at all times between the gate closed position and all positions upstream of the gate closed position or continuously downstream from the maximum upstream position to the gate closed position. Such control systems are described in greater detail in for example U.S. Patent Publication no. 20090061034 the disclosure of which is incorporated herein by reference. Where the position sensing system senses the position of the pin or other component multiple times throughout the course of the pin or other component movement, and real time velocity can be calculated by the controller 16, 176 a program or instructions can be alternatively used to receive a velocity data input by the user to the controller 16, 176 as the variable to be stored and processed instead of a position.

What is claimed is:

1. A method of performing an injection molding cycle in an injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the method comprising:

drivably interconnecting the valve pin to an electric motor driven by a source of electrical power or energy in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more intermediate rates of upstream and downstream travel extending between zero and a maximum rate of upstream travel and a maximum rate of downstream travel, selecting a length of travel between the third maximum upstream position and a predetermined third position that is downstream of the maximum upstream position and upstream of the first position, controllably operating the electric motor to drive the valve pin at one or more high rates of downstream travel that are equal to or less than the maximum rate of downstream travel when the valve pin is disposed at the third maximum upstream position during the course of an injection cycle, sensing the position of the valve pin to determine when the tip end of the valve pin has reached the preselected third position during the course of downstream travel, controllably operating the motor to drive the valve pin at one or more intermediate rates of downstream travel that are less than the one or more high rates of downstream travel when the tip end of the valve pin has been determined in the step of sensing to have reached the third position to drive the tip end of the valve pin downstream from the third position to the first position.

2. The method of claim 1 wherein the one or more high rates of downstream travel are equal to the maximum rate of downstream travel.

3. The method of claim 1 further comprising:

beginning the injection molding cycle from the first position, controllably operating the motor to drive the valve pin at one or more of the intermediate upstream rates of travel over the length of the path of upstream travel between the first position and the second position, sensing the position of the valve pin to determine when the tip end of the valve pin has reached the second position during the course of upstream travel, controllably operating the motor to drive the valve pin upstream from the second position to the maximum upstream position at one or more high upstream rates of travel that are greater than the intermediate upstream rates of travel.

4. The method of claim 3 wherein the motor is controllably operated to drive the valve pin continuously upstream from the second position to the maximum upstream position at the maximum rate of upstream travel.

5. An injection molding apparatus comprising a manifold that receives an injection fluid, the manifold distributing injection fluid to a fluid delivery channel that delivers the injection fluid under an injection pressure to a gate of a mold cavity and a valve pin having an axis and a tip end, the valve pin being slidably mounted for movement along the axis within the fluid delivery channel, the apparatus comprising:

an electric motor driven by a source of electrical power or energy, the electric motor being drivably interconnected to the valve pin in an arrangement wherein the electric motor drives the valve pin along the axis and drives the tip end of the valve pin between a first position where the tip end of the valve pin obstructs the gate to prevent the injection fluid from flowing into the cavity, a second position upstream of the first position wherein the tip end of the valve pin restricts flow of the injection fluid along at least a portion of the length of the drive path extending between the first position and the second position, and a third maximum upstream position where the injection fluid material flows freely without restriction from the tip end of the pin through the first gate, the electric motor being electrically operable to drive the valve pin at one or more intermediate rates of upstream and downstream travel extending between zero and a maximum rate of upstream travel and a maximum rate of downstream travel, a controller containing instructions that controllably operates the electric motor to drive the valve pin at one or more high rates of downstream travel that are equal to or less than the maximum rate of downstream travel when the valve pin is disposed at the third maximum upstream position during the course of an injection cycle, a sensor for sensing the position of the valve pin to determine when the tip end of the valve pin has reached a predetermined third position downstream of the maximum upstream position and upstream of the first position during the course of downstream travel, the controller including instructions that controllably operate the motor to drive the valve pin at one or more intermediate rates of downstream travel that are less than the one or more high rates of downstream travel to drive the tip end of the valve pin downstream from the third position to the first position when the tip end of the valve pin has been determined in the step of sensing to have reached the third position.

6. The apparatus of claim 5 wherein the one or more high rates of downstream travel are equal to the maximum rate of downstream travel.

7. The apparatus of claim 5 wherein the controller includes instructions that controllably operate the motor to drive the valve pin beginning from the first position at one or more of the intermediate upstream rates of travel between the first position and the second position, the sensor sensing the position of the valve pin to determine when the tip end of the valve pin has reached the second position during the course of upstream travel, the controller including instructions to controllably operate the motor to drive the valve pin upstream from the second position to the maximum upstream position at one or more high upstream rates of travel that are greater than the intermediate upstream rates of travel.

8. The apparatus of claim 7 wherein the controller includes instructions to controllably operate the motor to drive the valve pin continuously upstream from the second position to the maximum upstream position at the maximum rate of upstream travel.

9. The apparatus of claim 7 wherein the controller includes instructions to controllably operate the motor to drive the valve pin continuously upstream beginning from the first position at one or more of the intermediate upstream rates of travel over the entire length of travel of the valve pin from the first position to the maximum upstream position.

* * * * *